J. WILLIAMS.

FRUIT-DRIER.

No. 7,500.

Reissued Feb. 6, 1877.

Attest:

H. F. Eberts

Theo S. Bay

Inventor:

John Williams, per Attorney,

Thos. S. Sprague

UNITED STATES PATENT OFFICE.

JOHN WILLIAMS, OF SOUTH HAVEN, MICHIGAN.

IMPROVEMENT IN FRUIT-DRIERS.

Specification forming part of Letters Patent No. 143,949, dated October 21, 1873; reissue No. 7,500, dated February 6, 1877; application filed January 26, 1874.

*To all whom it may concern:*

Be it known that I, JOHN WILLIAMS, of South Haven, in the county of Van Buren and State of Michigan, have invented a new and Improved Apparatus for Evaporating and Drying Fruit and other Articles; and I do declare that the following is a true and accurate description thereof, reference being had to the accompanying drawings, and to the letters of reference marked thereon, and being a part of this specification, in which—

Figure 1:
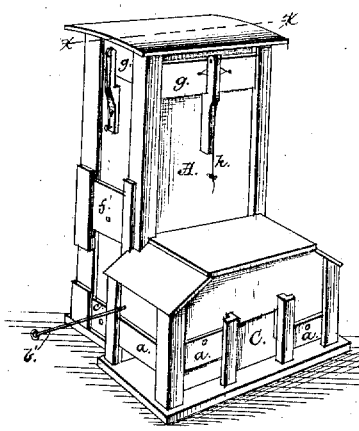
Figure 2:
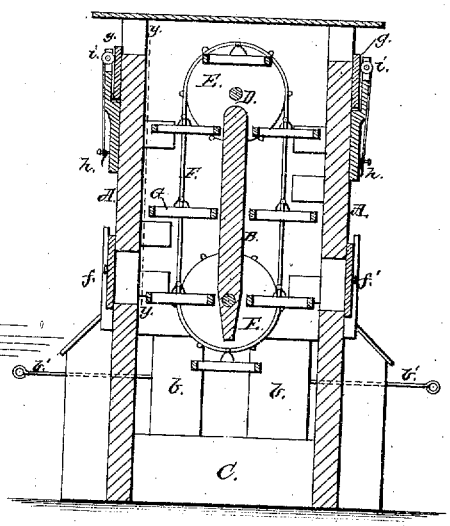
Figure 3:
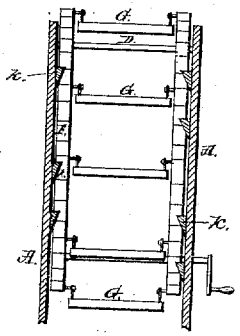
Figure 4:
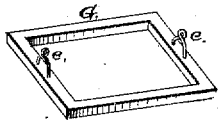
Figure 5:
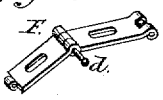

Figure 1 is a perspective view of my drier. Fig. 2 is a vertical section taken on the line *x x* in Fig. 1. Fig. 3 is a cross section of a flue on *y y* in Fig. 2, showing in elevation the inner face of the end wall thereof. Fig. 4 is a perspective view of one of the frames which are suspended between the chains for receiving the substances to be dried. Fig. 5 is a perspective view of a pair of links from one of the endless chains.

Like letters refer to like parts in the several figures.

The nature of this invention relates to an improved apparatus for evaporating and drying out the moisture contained in animal and vegetable substances.

The invention consists in a vertical shaft or trunk, communicating at its base with a chamber, in which air passing through it into the trunk is heated, which trunk is partially divided by a vertical partition into two rectangular flues. A pair of chain-wheels have their shaft journaled in the trunk-walls, parallel with and above the partition, and a second pair of chain-wheels, in like manner, have their shaft journaled below the said partition. Over these wheels run two endless chains, which gives them the motion of an oblong reel. The chain-links have projecting pins at intervals, upon which to suspend frames, upon which are placed perforated trays containing the substances to be dried, which trays, in the rotation of the chain-wheels, are carried around the partition before removal at the completion of the process, the trunk being provided with openings at the bottom for regulating the admission of cold air to either side, and similar openings at the top for regula ing the emission of the escaping air at the top of the drier, all being arranged to operate as more fully hereinafter set forth.

In the drawing, A represents a rectangular trunk, partially divided by a partition, B, into two flues. Below and in front of the trunk I place a heating-chamber, C, communicating therewith by an opening extending across the front wall of said trunk. Within the chamber may be placed a stove or furnace of any style preferred, to heat the cold air entering the chamber through openings in the sides, which are provided with sliding covers *a*, to regulate the admission or to shut it off at any one or more of the entrances, as may be required. *b b* are two sliding doors, whose united width equals the breadth of one of the flues, which doors are moved by the rods *b' b'*, to close the opening, which is in the front wall of the trunk at the base of the flues. By these doors I can direct the entire volume of heated air into either flue, or I can shut it off from one flue, or partially from both. At the base of the trunk cold-air inlets are provided, which may be closed or their area of opening adjusted by slides *c*. These openings are made in the side walls of the trunk, just above the top of the partition, and also carries a pair of chain-wheels. The diameter of the chain-wheels is such that the periphery of each extends midway across the flue at each side of the partition. F F are two endless chains, moving with and around the chain-wheels, the lower shaft being rotated by a crank on its rear end, which shaft extends through the wall of the flue to receive said crank, and is provided with a ratchet and pawl. The ratchet and pawl serve to hold the chains at whatever position they may be left in. At intervals in the length of each chain pins *d d* pivot the links together, which are elongated, as in Fig. 5, to receive the bail *e* of a light frame, G, at each end thereof, which frames are thereby suspended from the chains.

Each frame receives one or more trays of netting having numerous perforations, the trays being introduced and placed on the frames through an opening, *f*, in the side wall of one flue, and removed through an opening, *f*, opposite thereto in the side wall of the other flue, or it may be put in at one opening, carried under the partition, up one flue, down the other, and removed at the same, or pass to the other opening, both openings having doors to close them. In the top of the four walls of the trunk, directly under the projecting roof, openings are provided for the escape of warm currents of air laden with moisture absorbed from the drying substances in contact with which they have passed. Each opening is provided with a door sliding in grooves in the corner-posts, which door may be raised or lowered, to close or open it more or less, by a cord, *h*, passing over a bracket pulley operated by the attendant below, so that the heat may be retarded in its passage through the flues, or be permitted to escape freely, as circumstances may require. On the front and back walls of each flue I place deflectors *k*, at distances apart equal to the space from one frame on the chains to the next, for the purpose of directing the heated ascending currents from the ends of one tray toward the middle of the next one; or they may alternate in position to obstruct the currents of air that pass up the side walls of the flues, and cause it to pass through the trays containing the articles to be dried. The intensity of the heat being the greatest, however, at the commencement and close of the process, the trays containing the substances to be dried are first carried around under the partition, over the greatest heat, for the purpose of checking decomposition, to preserve it unchanged as near as possible, (except removing the moisture.) It is then carried up one flue, over and around the top of the partition, down the second flue, where it is subjected to a dry atmosphere for the purpose of thoroughly drying it.

I am aware that other machines have been invented for maturing, supermaturing, and dehydrating on close-fitting trays having a rising or falling motion. Such I do not claim. On the contrary, I preserve my fruit and other articles on loose-fitting trays having a rising and falling motion at the same movement, with an oblong reel motion, subjecting them at first to a high temperature to check decomposition, and, lastly, to thoroughly dry them.

I claim—

1. The air-chamber A, divided into two flues, each independently ventilated by means of dampers at top and bottom, and combined with a heating-chamber, C, for drying fruit and the like, substantially as described.

2. The divided and ventilated air-chamber A, provided with the endless-tray carriers F, in combination with the heating-chamber C, arranged at the lower end of the said air-chamber, and communicating directly therewith, in the manner described, whereby the substance being dried receives the maximum intensity of heat at its insertion in the air-chamber, substantially as and for the purpose specified.

3. A fruit-drying chamber provided with deflectors *k k*, in combination with the rotated trays, substantially as and for the purpose described.

4. The combination, in a fruit-drier, of the slides or dampers *c c* with the heating-chamber and the divided air-chamber, whereby the admission of heat to the flues of said air-chamber is regulated, substantially as and for the purpose specified.

5. The sliding covers *a*, in combination with the sliding doors *b b* and slides *c*, substantially as and for the purpose specified.

6. The air-trunk A, having partition B, and adjustable openings in its upper part, shafts D D, chain-wheels and endless chain F, frames G, and dampers *b b*, as described.

Witnesses: JOHN WILLIAMS.

HENRY E. BIDWELL,

HERBERT A. BURCH.